March 26, 1957 L. F. PITHER 2,786,307
METHOD OF MAKING GLASS-TO-METAL SEALS
Filed May 18, 1953
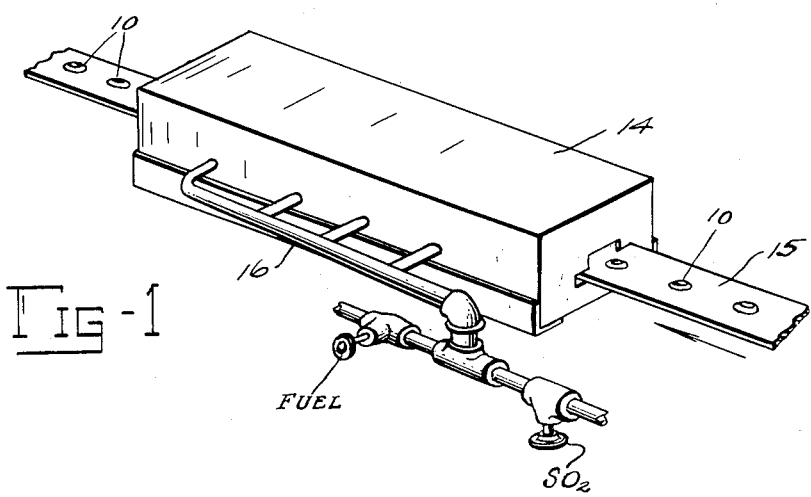
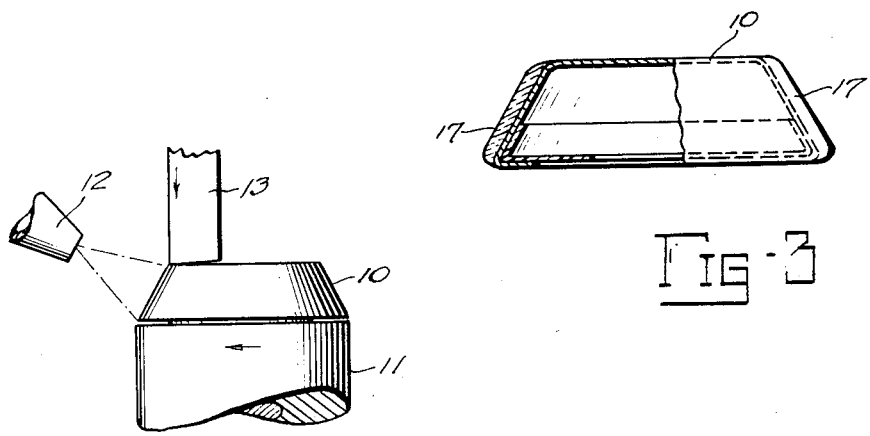
INVENTOR
LESLIE F. PITHER
BY
ATTORNEYS

United States Patent Office 2,786,307
Patented Mar. 26, 1957

2,786,307

METHOD OF MAKING GLASS-TO-METAL SEALS

Leslie F. Pither, Maumee, Ohio, assignor to Owens-Illinois Glass Company, a corporation of Ohio Application May 18, 1953, Serial No. 355,835

4 Claims. (Cl. 49—81)

This invention relates to glass-to-metal seals and particularly to such seals which are vacuumtight.

In the glass-to-metal sealing art, it has generally been known that the glass and meal must have substantially the same thermal expansion characteristics in order to prevent residual stresses from forming in the seal. More recently it has been suggested that the strength of the seal may be improved by application of an oxide coating to the metal prior to sealing. This has improved the strength of the seal but it has been found that excessive or overoxidation will produce a seal which is not vacuumtight. Even though the oxidation process whereby the oxide is applied to the metal is controlled, overoxidation may result during the sealing since the glass and metal must be subjected to high sealing temperatures for a prolonged period of time. In an effort to eliminate this overoxidation it has been proposed that a glass glaze or coating be fused to the metal prior to sealing. This glaze has been successful in preventing overoxidation of the metal during sealing and in addition, facilitates the sealing and results in a better seal. A problem has, however, arisen in conjunction with the application of the glass coating in that the coating contains, in many instances, numerous bubbles and pinholes and the edge of the coating is uneven and scalloped. These scalloped edges are one of the initial sources of checks and other weakening defects which result in failure of the seal or actual breaking of the ware.

It is therefore an object of this invention to provide an improved method of application of the glass glaze or coating in order that the ultimate seal may be stronger and vacuumtight.

Other objects of the invention will appear hereinafter.

Basically the invention comprises the use of $SO_2$ gas during the fusing of the glass coating to the metal.

Referring to the accompanying drawings:

Fig. 1 is an isometric view of an oven which may be used in practicing the method;

Fig. 2 is a schematic representation of the application of the coating; and

Fig. 3 is a part-sectional elevational view of a metallic anode button for television tubes having the glass coating applied thereto.

The invention has been found to be particularly important in the sealing of rigid metal parts to glass, for example, in the sealing of metal contact or anode buttons to television tubes. Referring to Fig. 3, an anode button 10 is generally of frusto-conical configuration. The button may have a thin oxide coating applied thereto. The glass coating is applied by dipping or spraying a mixture containing glass powder and a suitable vehicle. The method of spraying is shown schematically in Fig. 2 wherein the button 10 is rotated about its axis on a rotating spindle 11 and the solution is sprayed through a nozzle 12. A masking device 13 may be used to prevent the mixture from reaching the top of the button.

After the mixture has been applied to the button the resultant coating 17 is fused by application of heat, for example, as shown in Fig. 1, wherein the coated buttons are carried through an oven 14 by conveyor 15.

The invention comprises the use of $SO_2$ during the fusing operation. The $SO_2$ may be mixed with the fuel gas as shown in Fig. 1 wherein the fuel and $SO_2$ are mixed together and carried to a burner header 16. The $SO_2$ gas may also be applied separately without mixing in the header.

The glass coating may be fused by any other suitable means such as by direct flame or by induction. Whatever means is used, the $SO_2$ gas should be applied to the coating during the heating.

The glass powder which is used in the coating is preferably of the same composition as the glass to which the metal contact button is to be sealed. The composition of the powder may however be different providing the expansion characteristics of the glasses are compatible to provide a substantially stress-free glass-to-metal seal, in accordance with generally accepted principles.

The vehicle, which is used in the coating solution, preferably contains a suspending agent for maintaining the glass particles in suspension and a binding agent for temporarily binding the glass particles to the metal until the glass may be fused to the metal.

The following are representative examples of glass-to-metal seals wherein my invention may be used and is of importance:

*Example I*

Metal—Sylvania No. 4 alloy (Patent No. 2,394,919):

| | Percentage |
|---|---|
| Nickel | 42 |
| Chromium | 4–8 |
| Manganese | .25 |
| Iron | Balance |

Glass—Corning G–12:

| | |
|---|---|
| Silica ($SiO_2$) | 56.7 |
| Lead oxide (PbO) | 29.5 |
| Alumina ($Al_2O_3$) | 1.4 |
| Calcium oxide (CaO) | .1 |
| Sodium oxide ($Na_2O$) | 4.2 |
| Potassium oxide ($K_2O$) | 8.0 |
| Magnesium oxide (MgO) | 0.1 |

*Example II*

Metal—Sylvania No. 4 alloy  
Glass—Kimble K–30 (Patent No. 2,562,292):

| | Percentage |
|---|---|
| Silica ($SiO_2$) | 67.9 |
| Alumina ($Al_2O_3$) and iron oxide ($Fe_2O_3$) | 1.0 |
| Sodium oxide ($Na_2O$) | 4.3 |
| Potassium oxide ($K_2O$) | 10.6 |
| Calcium oxide (CaO) | 0.1 |
| Magnesium oxide (MgO) | 0.1 |
| Barium oxide (BaO) | 4.1 |
| Lead oxide (PbO) | 11.4 |
| Arsenic oxide ($As_2O_3$) | 0.1 |
| Lithium oxide ($Li_2O$) | 0.4 |

*Example III*

Metal—446 alloy:

| | Percentage |
|---|---|
| Chromium | 23–30 |
| Carbon | 0.25 |
| Magnesium | 2.00 |
| Sulfur | 0.03 |
| Phosphorus | 0.04 |
| Silicon | 1.00 |
| Iron | Balance |

Glass—Kimble K–30.

Example IV

Metal—446 alloy
Glass—Corning K-52

Example V

Metal—Sylvania No. 4 alloy.
Glass—Kimble K-52:

| | Percentage |
|---|---|
| Silica ($SiO_2$) | 68.4 |
| Alumina ($Al_2O_3$) and iron oxide ($Fe_2O_3$) | 2.4 |
| Sodium oxide ($Na_2O$) | 6.6 |
| Potassium oxide ($K_2O$) | 7.0 |
| Lithium oxide ($Li_2O$) | 0.6 |
| Calcium oxide (CaO) and magnesium oxide (MgO) | 0.2 |
| Barium oxide (BaO) | 9.4 |
| Lead oxide (PbO) | 5.3 |
| Antimony oxide ($Sb_2O_3$) | 0.2 |

Example VI

Metal—446 alloy
Glass—Kimble K-52

The above examples are representative of glass-to-metal seals wherein a glass coating is applied to the oxidized metal prior to sealing the metal to the glass. In each of the metals set forth in the above examples the part is first treated in any suitable manner to provide an oxidized coating on the metal part. This may be accomplished for example by subjecting the parts to an atmosphere of wet hydrogen as described in the patent to Kingston #2,502,855 issued April 4, 1950.

The composition of the glass powder in the solution which is applied to the metal parts in order to form the glass coating, is preferably the same as the composition of the glass to which the part is to be sealed. However, the composition of the glass powder may be varied within the limits and principles well known in the art with respect to compatibility of glass-to-metal seals. For example, I have found that the glass coating in Example II may be made by using glass powder having a composition of Corning G-12 glass.

In coating anode buttons, I have found that the glass powder is preferably of a size of minus 200 mesh. A satisfactory vehicle consists of a solution of alcohol, water, and a resinous gum. The amounts of the various constituents in the vehicle are adjusted in order to provide a satisfactory and workable solution. A typical spray vehicle may have the following composition:

1,000 cc. distilled water
1,000 cc. alcohol
50 cc. resinous gum

According to my invention, $SO_2$ gas is applied to the glass coating in each of the above examples during the heating of the coating to cause it to fuse.

The use of $SO_2$ gas during the fusing of the glass coating on an oxidized metal part prior to its being sealed with glass results in the elimination of minute bubbles, pinholes, and in a more even edge on the coating. By thus providing a better glass coating, not only is subsequent overoxidation of the metal prevented but in addition a stronger seal is obtained by elimination of the points of weakness which might be caused by minute bubbles, pinholes, or unevenness of the edge of the coating.

Modifications may be resorted to within the spirit and scope of the appended claims.

I claim:

1. The method of making a glass-to-metal seal which comprises applying a coating of a mixture of glass powder suspended in a vehicle to an oxidized metal part, applying heat to the coating to fuse the same, subjecting the coating to an atmosphere containing $SO_2$ gas during the fusing, and sealing the coated metal part to glass by applying heat.

2. The method of making a glass-to-metal seal which comprises applying a coating of a mixture of glass powder and a suspending vehicle to the surface of a metal part, said metal part comprising an alloy of nickel, chromium and iron and having an oxidized surface, fusing the coating by the application of heat, applying $SO_2$ gas to the coating during said heating, and sealing the coated metal part to glass by the application of heat.

3. The method of making a glass-to-metal seal which comprises applying a coating of a mixture consisting of a glass powder and a vehicle to a metal part having an oxidized surface, firing said coating by the application of a mixture of combustible gases and $SO_2$, and subsequently sealing said coated metal part to glass by the application of heat.

4. The method of making a glass-to-metal seal which comprises applying a coating of a mixture consisting of a glass powder and a vehicle to the oxidized surface of a metal part, firing said coating by the application of combustible gases, simultaneously directing $SO_2$ gas against said coating during said firing, and subsequently sealing the coated metal part to glass by the application of heat.

References Cited in the file of this patent

UNITED STATES PATENTS

| 2,254,945 | Hunt et al. | Sept. 2, 1941 |
| 2,300,454 | Lucas | Nov. 3, 1942 |
| 2,301,741 | Morris | Nov. 10, 1942 |
| 2,542,043 | McIntyre | Feb. 20, 1951 |
| 2,596,694 | Kegg | May 13, 1952 |
| 2,629,093 | Pask et al. | Feb. 17, 1953 |

OTHER REFERENCES

"Enamels," Andrews, Twin City Printing Co., 1935 first ed., pages 300–302. (Copy in Div. 25.)

"Manual of Porcelain Enameling," Hanson, Enamelist Publ. Co., 1937, pages 384–387. (Copy in Division 25.)